July 9, 1940.  E. F. WEAVER  2,207,308
ELECTROLYTIC MANUFACTURE OF COPPER CARBONATES
Filed April 24, 1937
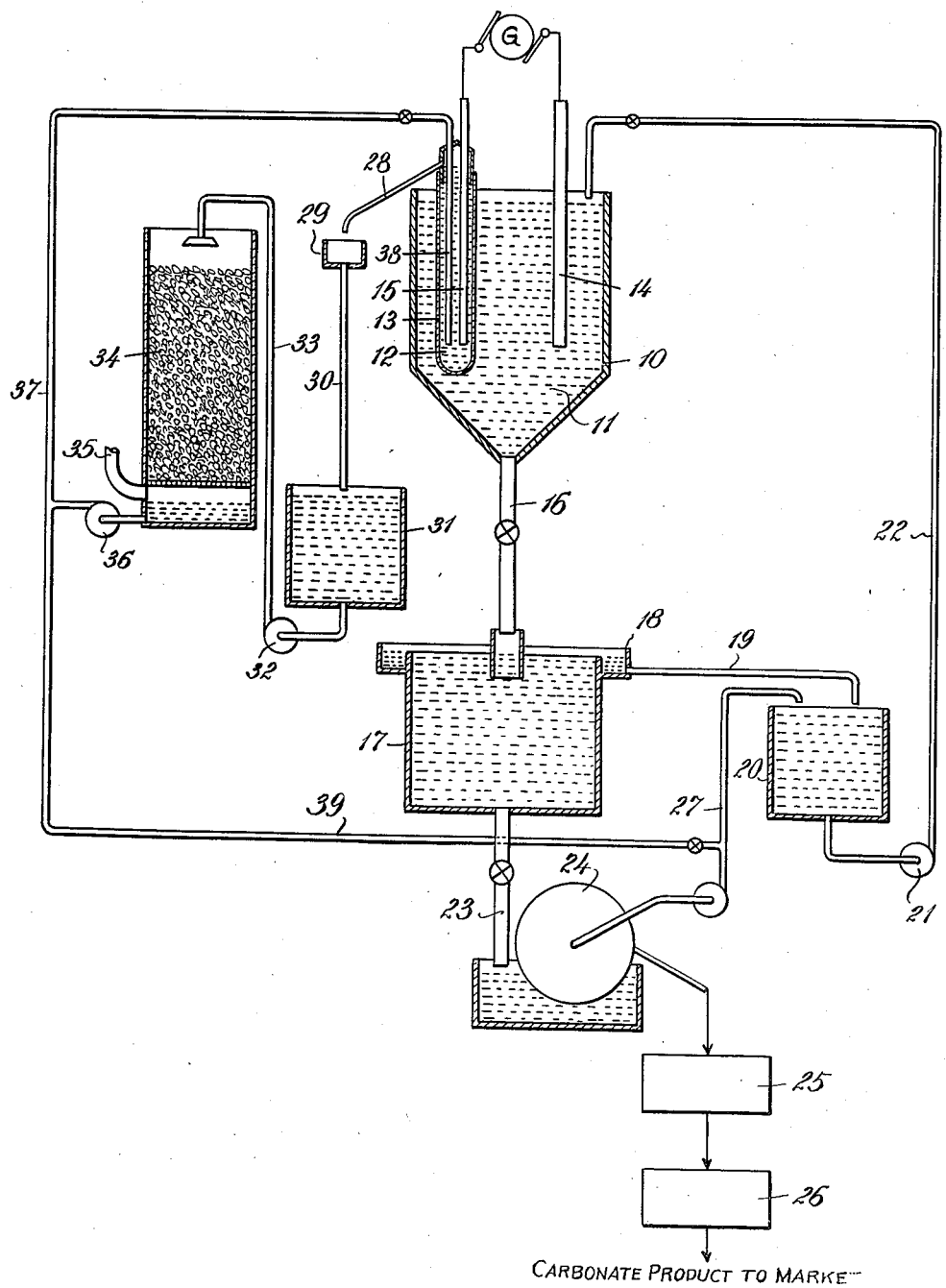
CARBONATE PRODUCT TO MARKET
INVENTOR
ELBERT FRANKLIN WEAVER
BY
Pennie Davis Marvin & Edmonds
ATTORNEYS Patented July 9, 1940

2,207,308

UNITED STATES PATENT OFFICE 2,207,308

ELECTROLYTIC MANUFACTURE OF COPPER CARBONATES

Elbert Franklin Weaver, Calumet City, Ill., assignor to International Smelting & Refining Company, a corporation of Montana Application April 24, 1937, Serial No. 138,698

10 Claims. (Cl. 204—9)

This invention relates to the manufacture of copper carbonates and has for its principal object the provision of a method for producing copper carbonates, particularly cupric carbonates, electrolytically. In accordance with the method of the invention, features of control provide for insuring satisfactory progress of the reactions involved and the efficient production of the final product. The invention also provides a new product in the form of electrolytically prepared copper carbonates of uniformly high quality.

Copper carbonates in finely divided form are used extensively as bases in antifouling paints and in preparing insecticides and fungicides of various kinds. To some extent copper carbonates in suitable form for such uses are produced directly from the naturally occurring minerals, malachite and azurite. These minerals are natural basic carbonates of copper. For the most part, however, copper carbonates are produced chemically by precipitation by means of soluble carbonates from suitable solutions of soluble salts of copper. Precipitates thus obtained are invariably basic, but the degree of basicity depends upon the conditions under which the precipitation is made. The ordinary cupric carbonate of commerce approximates $2CuO \cdot CO_2 \cdot H_2O$, the formula for natural malachite, and contains from about 66% to about 78% CuO.

There is no stable normal carbonate of copper. The two natural carbonates of copper, azurite and malachite, are both basic and differ from each other only in their degree of basicity. This difference, however, is sufficient to impart quite different physical and chemical characteristics, as is indicated in the following table:

|  | Azurite | Malachite |
|---|---|---|
| Chemical formula | $2CuCO_3 \cdot Cu(OH)_2$ | $CuCO_3 \cdot Cu(OH)_2$. |
| Color | Blue | Green. |
| Percent Cu | 55.35 | 57.55. |
| Percent CuO | 69.26 | 71.95. |
| Percent $CO_2$ | 25.52 | 19.91. |
| Specific gravity | 3.71 to 3.77 | 3.35 to 4.03. |

It will be observed that the color of these compounds varies with the degree of their basicity, as measured, for example, by the proportions of the constituents CuO and $CO_2$ in the compounds. The same is true of such other characteristics as specific gravity, solubility in various solvents, and particle size and shape. These characteristics have a decided influence on the settling properties of the compound and hence upon their value for use in antifouling paints and insecticide preparations, because when used for these purposes the compound should exhibit little tendency to settle and should be but slightly soluble.

It has been found that in preparing copper carbonates electrolytically in a bifluid electrolytic cell it is possible to control the physical and chemical characteristics of the carbonate product within close limits. In producing copper carbonates in accordance with the invention, an electric current is passed through a bifluid electrolytic cell comprising a soluble copper anode, an anolyte containing a substance capable of serving upon electrolysis as a solvent for copper, a diaphragm, a catholyte containing carbonate ions, and an insoluble anode. The copper carbonate product forms in the anolyte and is separated therefrom in any suitable manner.

It is important to exercise control over certain conditions prevailing during operation of the cell in order to insure efficient progress of the reactions that occur. For example, the pH of the anolyte should be maintained at a value above about 8.0, because at lower pH values copper appears in solution in the anolyte and plates out at the cathode.

The nature of the copper carbonate product formed in the cell depends on the concentration of carbonate ions, the concentration of hydroxyl ions, and the concentration of bicarbonate ions in the anolyte. Consequently it is important to control the concentrations of these ions to control the nature of the cell product. In producing certain copper carbonates, the value of the ratio between the concentration of carbonate ions and the concentration of hydroxyl ions in the anolyte should be controlled to insure formation of the desired products.

Carbonate ions are introduced into the anolyte primarily by migration from the catholyte through the diaphragm. It is possible to introduce all of the necessary carbonate into the anolyte by such migration by employing a diaphragm of sufficiently high permeability. For purposes of practical control, however, it is preferred to employ a diaphragm of somewhat less than sufficinetly high permeability and to make up for this deficiency of the diaphragm by maintaining the catholyte under a slight hydrostatic head with respect to the anolyte. The hydrostatic head of the catholyte may be adjusted from time to time, if necessary, to insure a proper rate of transfer of carbonate ions from the catholyte to the anolyte. Final adjustment of the concentration of carbonate ions in the anolyte is most easily effected by making small additions thereto, preferably outside the reacting zone of the cell, of a substance capable of yielding carbonate ions.

The method of the invention may be carried out in any suitable bifluid electrolytic cell comprising an anode, an anolyte, a diaphragm, a catholyte, and a cathode. Advantageously provision is made for withdrawing anolyte from the cell and for returning it thereto in order to effect circulation of anolyte through the cell. The copper carbonate product formed in the anolyte is separated therefrom during the course of its passage through the anolyte circulation system, and the resulting clarified anolyte is returned to the cell. Provision advantageously also is made for withdrawing catholyte from the cell and for returning it thereto in order to effect circulation of the catholyte through the cell. The catholyte becomes depleted in carbonate ions in the cell, and provision therefore is made to incorporate carbonate ions in the catholyte during the course of its passage through the catholyte circulation system outside the cell. This may be accomplished, for example, by passing the catholyte in contact with carbon dioxide outside the reacting zone of the cell. The thus treated catholyte is returned to the cell.

The catholyte is a convenient source of carbonate ions for use in making adjustments in the concentration of carbonate ions in the anolyte, and for this purpose provision advantageously is made for adding a small portion of the catholyte to the anolyte.

In carrying out the method of the invention, an electric current is passed through a bifluid cell such as described above from a soluble copper anode through an anolyte, a diaphragm and a catholyte to a suitable cathode. The anode is soluble and is the source of the metal component of the copper carbonate product. It is of copper from any suitable source and is shaped for convenient suspension in the bifluid cell in contact with the anolyte.

The anolyte solution employed is a water solution of a salt of an alkali or alkaline earth metal which, upon electrolysis, is capable of yielding a soluble salt of copper. Experiments have indicated that sodium sulphate is a particularly satisfactory salt for this purpose, but there are other salts, such as potassium sulphate, which may be used. Sodium acetate, which is commonly used as a substance capable of serving as a solvent for lead in the electrolytic production of lead salts, is not as suitable as sodium sulphate for use in preparing the anolyte employed in carrying out the present invention, because during electrolysis some basic copper acetate is formed and precipitates with the cell product. Similarly, a solution of sodium chloride is not as satisfactory for use in preparing the anolyte as sodium sulphate because it leads to the formation of cuprous oxide at the anode and because of the solubility of copper carbonate in chloride solutions.

Suitable apparatus for use in carrying out the method of the invention is shown schematically in the accompanying drawing. The apparatus comprises an electrolytic cell 10 which is divided into an anolyte compartment 11 and a catholyte compartment 12 by a suitable diaphragm 13. An anode 14 of copper is suspended in the anolyte compartment 11 in contact with the anolyte therein, and a cathode 15 of iron or other suitable material is suspended in contact with the catholyte in the catholyte compartment 12. The anode 14 and cathode 15 are suitably connected to the terminals of a generator G or other source of current.

In operation of the cell, a carbonate product is formed in the anolyte, and the resulting mixture of anolyte and cell product is withdrawn, preferably continuously, from the hopper bottom of the cell 10 through a valved conduit 16 to a settling tank 17. In the settling tank the carbonate product settles from the anolyte, and the resulting clarified anolyte overflows the top of the settling tank into a launder 18, from which it flows through a suitable conduit 19 to an anolyte storage vessel 20. A pump 21 provides for returning anolyte through a conduit 22 to the anolyte compartment 11 of the cell 10.

The copper carbonate product settling from suspension in the settling tank 17 is withdrawn through a spigot 23 together with a small quantity of anolyte and is passed to a vacuum drum type or other suitable filter 24. The solid product collected on the filter is washed for the recovery of the anolyte salts that it contains, and thence is passed through a drier 25 and a grinding mill 26 to prepare it for the market.

The filtrate and wash waters from the filter 24 are pumped through a conduit 27 to the anolyte storage vessel 20.

In order to effect circulation of catholyte through the catholyte compartment of the cell 10, catholyte, which is maintained under a slight hydrostatic head with respect to the anolyte in the cell, is withdrawn, preferably continuously, through a suitable overflow conduit 28 to a launder 29, from which it flows through a conduit 30 to a catholyte storage vessel or sump 31. In operation of the cell, the catholyte becomes depleted in carbonate ions and enriched in hydroxyl ions, and means are provided to neutralize the resulting excess hydroxyl alkalinity of the catholyte and to replenish its carbonate content. For this purpose, catholyte is forced by a pump 32 from the catholyte storage vessel 31 through a conduit 33 to the top of a packed carbonating tower 34, down through which it is sprayed. As the catholyte passes downwardly, it comes in contact with a rising current of carbon dioxide introduced into the bottom of the tower 34 through a suitable conduit 35. The carbon dioxide may be derived from any suitable source, such as the flue gases from a boiler. The descending alkaline catholyte solution absorbs the carbon dioxide and thereby its hydroxyl ion alkalinity becomes at least partially neutralized and its carbonate ion concentration increased. The thus regenerated catholyte is returned by means of a pump 36 through a conduit 37 to the catholyte compartment 12 of the cell 10. The catholyte is introduced into the catholyte compartment through a conduit 38 extending almost to the bottom of the catholyte compartment to insure circulation of the catholyte through the catholyte compartment.

In order to effect proper adjustment of the carbonate ion concentration of the anolyte, a valved conduit 39 is provided for making such additions of regenerated catholyte to the anolyte as may be desired.

When an electric current is passed through a cell such as described above, using sodium sulphate as the substance in the anolyte capable of serving as a solvent for copper and sodium carbonate as the source of carbonate ions in the catholyte, copper carbonate is formed in the anolyte, probably substantially as follows.

Under the influence of the current, copper dissolves from the anode and passes into solution as copper sulphate:

$$Cu + Na_2SO_4 \rightarrow CuSO_4 + 2Na^+$$

The sodium ions thus liberated migrate to the cathode, where they react with water to form sodium hydroxide and liberate hydrogen:

$$2Na^+ + 2H_2O \rightarrow 2NaOH + H_2$$

The copper sulphate formed in the anolyte reacts immediately with sodium carbonate and sodium hydroxide in the anolyte to precipitate a basic copper carbonate:

$$2CuSO_4 + Na_2CO_3 + 2NaOH \rightarrow CuCO_3 \cdot Cu(OH)_2 + 2Na_2SO_4$$

The sodium sulphate is regenerated in the anolyte by this reaction. The sodium hydroxide formed in the catholyte is converted back to sodium carbonate by reaction with carbon dioxide, preferably during circulation of the catholyte outside the reacting zones of the cell:

$$2NaOH + CO_2 + H_2O \rightarrow Na_2CO_3 + 2H_2O$$

The above reactions represent the formation of the more basic of the copper carbonates. This product is formed only when the hydroxyl ion concentration in the anolyte is sufficiently high to satisfy the indicated requirement of sodium hydroxide. If no sodium hydroxide is available in the anolyte to react with the copper sulphate and the sodium carbonate in the anolyte, the less basic copper carbonate is formed. As when preparing the more basic carbonate product, copper from the anode, under the influence of the electric current, passes into the anolyte as copper sulphate, with the attendant formation of sodium hydroxide in the catholyte. The copper sulphate thus formed reacts at once with sodium carbonate in the anolyte to form the less basic carbonate product:

$$3CuSO_4 + 4Na_2CO_3 + 2H_2O \rightarrow 2CuCO_3 \cdot Cu(OH)_2 + 2NaHCO_3 + 3Na_2SO_4$$

Sodium bicarbonate formed in the course of this reaction will be neutralized by sodium hydroxide migrating from the catholyte.

$$NaHCO_3 + NaOH \rightarrow Na_2CO_3 + H_2O$$

It is apparent from the foregoing reactions that the more basic copper carbonate is formed when the molar concentration of the sodium hydroxide available in the anolyte for reaction with the copper sulphate is twice the molar concentration of the available sodium carbonate. The less basic carbonate product is formed when no sodium hydroxide is available for reaction in the anolyte. Intermediate basic copper carbonates are formed when the molar proportions of the available sodium carbonate and the available sodium hydroxide fall between these two values.

There are three variables involved in the cell reactions which should be controlled in order to secure efficient operation of the process. These variables are the hydroxyl ion ($OH^-$) concentration in the anolyte, the carbonate ion ($CO_3^{--}$) concentration in the anolyte, and the bicarbonate ion ($HCO_3^{--}$) concentration in the anolyte. Under more or less ideal conditions, with an adequately permeable diaphragm, the rate at which carbonate ions migrate into the anolyte from the catholyte is chemically equivalent to the rate at which carbonate ions are consumed in the production of the copper carbonate product. For the purpose of securing a fairly wide range of control over the nature of the cell product, however, it is preferred to employ a diaphragm of less permeability than would be adequate for ideal operation, and to provide means for controlling the $OH^-$, $CO_3^{--}$ and $HCO_3^-$ concentrations in the anolyte. For this purpose, the catholyte in the cell is maintained under a slight hydrostatic head with respect to the anolyte. The hydrostatic head of the catholyte may be controlled within limits, and by increasing or decreasing it with respect to the anolyte, the rate of transfer of carbonate ions from the catholyte to the anolyte may be increased or decreased correspondingly. Final adjustment of the concentration of carbonate ions in the anolyte advantageously is made by making small additions of catholyte, containing carbonate ions, to the anolyte at some point outside the reacting zone of the cell. Such additions may be made intermittently or continuously, as is most desirable in any particular operation, and in small quantities, the exact amount being dependent on the nature of the particular operation.

Other factors also have considerable influence on the nature of the product formed in the cell and should be controlled for most satisfactory results. As mentioned above, it is important to maintain the pH of the anolyte at a value above about 8. Below this pH value soluble copper appears in the anolyte, and soluble copper is objectionable because if present it will deposit at the cathode. The pH of the anolyte is therefore maintained above about 8.0, and preferably above about 8.6. Either carbonate or hydroxyl ions, or both, must be present in the anolyte to maintain this condition, and their concentrations should be sufficient so that all of the copper dissolved from the anode will be precipitated without causing the anolyte alkalinity to be decreased below this value. The concenration of carbonate and hydroxide in solution in the anolyte should not be allowed to become very high, however, because if these concentrations are too high a crust of copper carbonate forms on the anode and interferes with anode corrosion. Moreover, the concentration of carbonate ions and of hydroxyl ions in the anolyte should be less than the concentration of the corresponding ions in the catholyte, in order to avoid diffusion of these ions from the anolyte into the catholyte.

The temperature at which the cell is operated influences the nature of the copper carbonate product formed. Other factors remaining the same, the basicity of the copper carbonate product is greater if the cell is operated at room temperature than if it is operated at, say, about 50° C.

The method of the invention advantageously is operated continuously. In continuous operation of the method of the invention, the catholyte and anolyte circulate continuously through their respective compartments in the bifluid cell, with carbonate ions and hydroxyl ions migrating continuously and at a substantially constant rate through the diaphragm. Carbon dioxide is supplied continuously to the catholyte, preferably at a constant rate, and the copper carbonate product is separated continuously from the anolyte.

In order to secure most efficient formation of the desired copper carbonate product, some attention should be paid to factors such as cell voltage, current density, and rate of flow of anolyte through the anolyte compartment. The following data, obtained in producing a basic copper carbonate product, are given as illustrative of a specific operation of the method of the invention.

Copper anodes were electrolyzed on either side of diaphragmed cathodes in the presence of electrolytes of the following composition and under the operating conditions set forth:

|  | Anolyte | | Catholyte | |
|---|---|---|---|---|
|  | Feed | Discharge | Feed | Discharge |
| Percent $Na_2CO_3$ | .171 | .141 | 9.54 | 9.02 |
| Percent $NaHCO_3$ | .148 | .146 |  |  |
| Percent $NaOH$ |  |  | .10 | .42 |
| Percent $Na_2SO_4$ | 4.0 | 4.0 | 1.8 | 1.8 |
| pH | +8.8 | +8.8 |  |  |
| Soluble copper | None | None |  |  |

Cell voltage_____ 3.0
Amps. per sq. ft. cathode_____ 20
Temperature_____°C__ 47

The analysis of the cell product after filtering, washing and drying was as follows:

| Percent Cu | Percent CuO | Percent $CO_2$ | Percent $H_2O$ |
|---|---|---|---|
| 55.90 | 69.90 | 17.30 | .10 |

The color of this product was a distinct blue green. When 10 grams of the finely divided product was mixed with 60 cc. of mineral spirits and allowed to settle for 2 hours, the volume of the settled portion was found to be 18.5 cc.

Under different cell conditions, products having different chemical and physical properties have been prepared. For example, by operating the cell with a higher carbonate alkalinity in the anolyte, a product having a somewhat higher settling rate and a higher $CO_2$ content is produced. When the cell is operated at room temperature a product of very fine particle size which exhibits low settling tendencies and a high tinting strength is produced. This product is of an olive green color as compared with the bluish green of the products produced at the higher temperatures.

Copper carbonate products produced in accordance with the present invention are superior to similar products produced in accordance with heretofore known methods. Their physical and chemical characteristics, which may be predetermined by proper control of the method of the invention, are such as to render them better suited for use in antifouling paints, insecticide preparations and similar compositions than heretofore known copper carbonate products. Electrolytically prepared copper carbonates are distinguishable from the ordinary finely divided copper carbonate of commerce by visual comparison, by which their finer texture and more uniform grain structure and particle size and shape may be perceived.

The method of the invention proceeds efficiently and economically. The only reagents consumed in operation of the process are the copper of the anode, water, and carbon dioxide. Power requirements of the process are not high, nor are the labor costs for operating the process. The only other source of expense in operating the process of the invention is for reagents lost unavoidably by spillage or leakage, but with proper care these losses may be held to an almost negligible amount. The process is therefore well suited for use in the commercial production of copper carbonates.

I claim:

1. The method of producing a copper carbonate product which comprises passing an electric current through a bifluid electrolytic cell comprising a copper anode, an anolyte containing a sulphate in aqueous solution and capable of serving upon electrolysis as a solvent for copper, a diaphragm, a catholyte containing carbonate ions, and a cathode, maintaining the pH of the anolyte at a value exceeding about 8.0, and maintaining carbonate ions in the catholyte in sufficient quantities for migration through the diaphragm into the anolyte with resultant formation of copper carbonate.

2. The method of producing a copper carbonate product which comprises passing an electric current through a bifluid electrolytic cell comprising a copper anode, an anolyte containing a sulphate in aqueous solution and capable of serving upon electrolysis as a solvent for copper, a diaphragm, a catholyte containing carbonate ions, and a cathode, maintaining carbonate ions in the catholyte in sufficient quantities for migration through the diaphragm into the anolyte with resultant formation of copper carbonate and controlling the composition of the copper carbonate product formed in the cell by controlling the concentration of hydroxyl ions in the anolyte.

3. The method of producing a copper carbonate product which comprises passing an electric current through a bifluid electrolytic cell comprising a copper anode, an anolyte containing a sulphate in aqueous solution and capable of serving upon electrolysis as a solvent for copper, a diaphragm, a catholyte containing carbonate ions, and a cathode, maintaining carbonate ions in the catholyte in sufficient quantities for migration through the diaphragm into the anolyte with resultant formation of copper carbonate and controlling the composition of the copper carbonate product formed in the cell by controlling the concentration of bicarbonate ions in the anolyte.

4. The method of producing a copper carbonate product which comprises passing an electric current through a bifluid electrolytic cell comprising a copper anode, an anolyte containing a sulphate in aqueous solution and capable of serving upon electrolysis as a solvent for copper, a diaphragm, a catholyte containing carbonate ions, and a cathode, maintaining carbonate ions in the catholyte in sufficient quantities for migration through the diaphragm into the anolyte with resultant formation of copper carbonate and controlling the composition of the copper carbonate product formed in the cell by controlling the value of the ratio between the concentration of hydroxyl ions and the concentration of carbonate ions in the anolyte.

5. The method of producing a copper carbonate product which comprises passing an electric current through a bifluid electrolytic cell comprising a copper anode, an anolyte containing a sulphate in aqueous solution and capable of serving upon electrolysis as a solvent for copper, a diaphragm, a cetholyte containing carbonate ions, and a cathode, maintaining carbonate ions in the catholyte in sufficient quantities for migration through the diaphragm into the anolyte with resultant formation of copper carbonate and controlling the nature of the copper carbonate product by controlling the temperature of the anolyte.

6. The method of producing a copper carbonate product which comprises passing an electric current through a bifluid electrolytic cell comprising a copper anode, an anolyte containing a sulphate in aqueous solution and capable of serving upon electrolysis as a solvent for copper, a diaphragm, a catholyte containing carbonate ions, and a cathode, maintaining carbonate ions in the catholyte in sufficient quantities for migration through the diaphragm into the anolyte with resultant formation of copper carbonate, withdrawing anolyte from the cell, adding small portions of catholyte to the withdrawn anolyte to adjust the concentration of carbonate ions therein to a value corresponding to the composition of the desired carbonate product, and returning the thus treated anolyte to the cell.

7. The method of producing copper carbonate which comprises passing an electric current through a bifluid electrolytic cell comprising a copper anode, an anolyte containing sodium sulphate, a diaphragm, a catholyte containing sodium carbonate, and an insoluble cathode, maintaining the pH of the anolyte at a value exceeding about 8.6, and maintaining carbonate ions in the catholyte in sufficient quantities for migration through the diaphragm into the anolyte with resultant formation of copper carbonate.

8. The method of producing copper carbonate which comprises passing an electric current from a copper anode to a cathode in a bifluid electrolytic cell comprising an anolyte in contact with the anode, a catholyte in contact with the cathode, and a porous diaphragm disposed in the path of flow of the electric current and separating the anolyte and the catholyte, employing as anolyte an aqueous solution containing sodium carbonate, sodium bicarbonate and sodium sulphate in about the proportions sodium carbonate 0.141% to 0.171%, sodium bicarbonate 0.146% to 0.148%, sodium sulphate 4.0%, and employing as catholyte an aqueous solution containing sodium carbonate, sodium hydroxide and sodium sulphate in about the proportions sodium carbonate 9.02% to 9.54%, sodium hydroxide 0.10% to 0.42%, sodium sulphate 1.8%.

9. The method of producing copper carbonate which comprises passing an electric current from a copper anode to a cathode in a bifluid electrolytic cell comprising an anolyte in contact with the anode, a catholyte in contact with the cathode, and a porous diaphragm disposed in the path of flow of the electric current and separating the anolyte and the catholyte, employing as catholyte an aqueous liquid containing carbonate ions, employing as anolyte an aqueous liquid containing sulphate ions, sodium carbonate and sodium hydroxide and in which the sodium carbonate and sodium hydroxide available for reaction with copper sulphate formed are present in predetermined molar proportions, and maintaining carbonate ions in the catholyte in sufficient quantities for migration through the diaphragm into the anolyte with resultant formation of copper carbonate.

10. The method of producing copper carbonate which comprises passing an electric current from a copper anode to a cathode in a bifluid electrolytic cell comprising an anolyte in contact with the anode, a catholyte in contact with the cathode, and a porous diaphragm disposed in the path of flow of the electric current and separating the anolyte and the catholyte, employing as catholyte an aqueous liquid containing carbonate ions, employing as anolyte an aqueous liquid containing sulphate ions, conducting the operation at a temperature substantially higher than room temperature, and maintaining carbonate ions in the catholyte in sufficient quantities for migration through the diaphragm into the anolyte with resultant formation of copper carbonate.

ELBERT FRANKLIN WEAVER.